No. 664,973. Patented Jan. 1, 1901.
H. P. SCOTT.
BALL BEARING SEAT.
(Application filed Apr. 20, 1900.)
(No Model.)
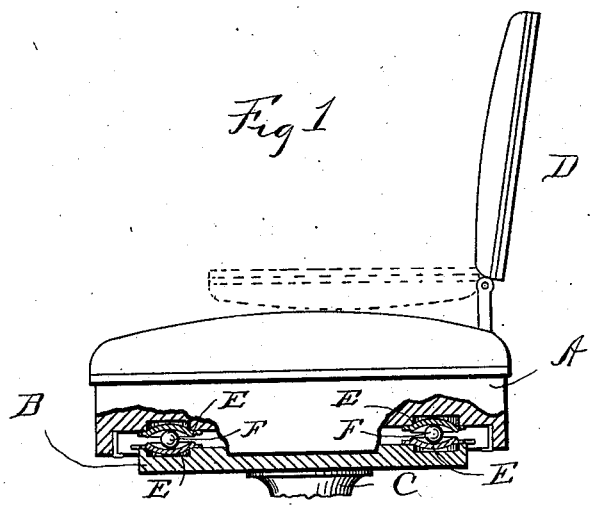
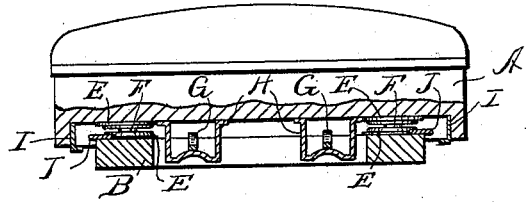
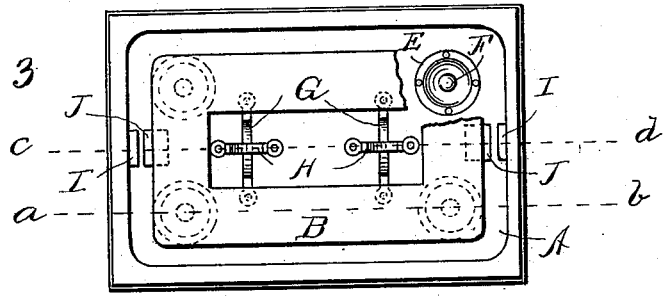
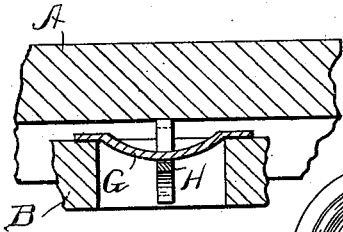  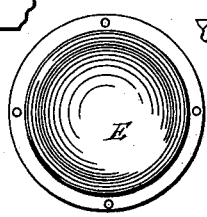  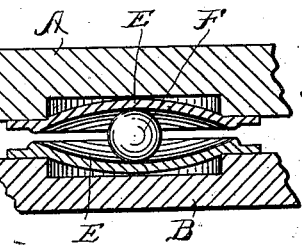
Witnesses
Inventor
H. P. Scott,
By his Attorney
Warren D. House,

UNITED STATES PATENT OFFICE.

HENRY P. SCOTT, OF KANSAS CITY, MISSOURI, ASSIGNOR OF ONE-FOURTH TO ARBA F. PIERCE, OF SAME PLACE.

BALL-BEARING SEAT.

SPECIFICATION forming part of Letters Patent No. 664,973, dated January 1, 1901.

Application filed April 20, 1900. Serial No. 13,635. (No model.)

*To all whom it may concern:*

Be it known that I, HENRY P. SCOTT, a citizen of the United States, residing in Kansas City, in the county of Jackson and State of Missouri, have invented a new and useful Improvement in Ball-Bearing Seats, of which the following is a specification, reference being had to the accompanying drawings, forming a part thereof.
My invention relates to improvements in ball-bearing seats.

The object of my invention is to provide a ball-bearing seat for use on locomotives, chair-cars, and other places in which a person is subjected to the disagreeable oscillation or vibration due to the movement of the car or locomotive or other vehicle. It is the aim of my invention to prevent the disagreeable effects of such movement.
My invention provides, further, a novel form of ball-bearing adapted for use as a car or vehicle support.

My invention provides, further, a stationary member, a movable member serving as the seat proper, each member being provided with a plurality of ball-cups disposed oppositely to the ball-cups on the other member, and a ball disposed between each set of cups on which the cups have a bearing.
My invention provides, further, certain novel retaining devices for preventing dislocation of the balls from the cups, and yet permitting free movement of the movable member.
My invention provides, further, other features of construction hereinafter fully described and claimed.

In the accompanying drawings, which illustrate my invention, Figure 1 represents a side elevation view of a ball-bearing seat of my construction, a portion being broken away on the line *a b* of Fig. 3. Fig. 2 represents another side elevation view, a portion being shown in vertical section, taken on the dotted line *c d* of Fig. 3. Fig. 3 represents a bottom view, a corner of the stationary member being broken away, so as to disclose one of the upper cups with the ball retained therein. Fig. 4 represents a transverse vertical sectional view of a portion of the upper and also the lower member, showing the form of the portion G. Fig. 5 represents a plan view of one of the ball-cups. Fig. 6 represents a vertical sectional view of an upper and a lower cup, together with portions of the movable and stationary members and showing a ball in place between the cups.

Similar letters of reference indicate similar parts.

A indicates the seat proper or movable member, preferably cushioned upon the upper side and disposed above the stationary member B, which may be mounted upon any suitable support—as, for instance, a central post, the upper end of which is shown in Fig. 1 and indicated by C. The portion which I will term the "seat" may be provided with a back-rest D, preferably having a hinged connection with the seat, so it may be swung into the position shown in dotted lines in Fig. 1. The upper side of the support B and the lower side of the seat A are provided with a plurality of ball-cups E, the concave sides of the cups of one member facing the concave sides of the cups on the other member and the cups of one member pairing with the cups in the other member. Between each pair of cups is located a ball F. The upper member has a rolling support upon the said balls, which are free to roll in the lower cups. The formation of the cups gives a spring-like resistance to the movement of the seat. In whatever direction the seat moves from the central position the balls rolling in the cups cause the seat to rise, thus lifting the seat, with the person carried by it, the effect being to produce a spring-like resistance to the movement of the seat and weight carried by it.

In the center of the member B is an opening therethrough, in which are disposed one or more U-shaped retaining devices H, the upper ends of the arms of which are secured to the under side of the member A. Bridging the said opening in the member B are one or more retaining devices G, which are secured at their ends to the upper side of the member A and the under sides thereof being convexly curved. The devices G are disposed at right angles to the devices H, the curved surfaces of the devices G being located above the similarly-curved surfaces of the devices H. The upper sides of the retaining devices H and the under sides of the retaining devices G are of a form which will permit the member A to rise in a curvilinear manner when the member is moved laterally upon the balls. The distance between the retaining devices G and H is such as to prevent them from having rubbing contact with each other when the member A is rolled on the balls F, and yet close enough to prevent the members becoming separated sufficiently to permit the balls to fall from between the upper and lower seats E. In order to prevent too great a strain being placed upon the retaining devices G and H when the movable member is moved laterally, supplemental retaining devices are employed, comprising oppositely-disposed plates J, secured to and projecting beyond the sides of the member B. These plates are adapted to respectively engage the plates I, secured upon the member A, each plate I being provided with an inwardly-extending flange adapted to come into contact with the under side of the corresponding member J when the member A has moved laterally sufficiently.

Various departures from the construction shown may be made without departing from the spirit of my invention.

Having thus described my invention, what I claim, and desire to secure by Letters Patent, is—

1. A ball-bearing comprising two relatively-movable members, a plurality of balls on which the members have a rolling bearing, means by which one of the members in rolling can describe a curve when moved in any lateral direction, a similarly-curved guide on one member and a guide on the other member coöperating with such curved guide to prevent the separation of the members, substantially as described.

2. A ball-bearing comprising two relatively-movable members, a curved retaining device on one of the members, a retaining device on the other member embracing the curved portion of the other retaining device, a plurality of balls on which the members have a rolling bearing, and means by which one of the members describes a curve similar to the curve of the curved retaining device when the said member is moved laterally in any direction, substantially as described.

3. A ball-bearing comprising two relatively-movable members, a plurality of balls on which the members have a rolling bearing, means by which the members in moving on the balls in any direction describe a curvilinear movement, a retaining device on one member provided with a curved surface, and a retaining device on the other member provided with a similarly-curved surface which coöperates with the curved surface of the other retaining device for preventing the separation of the two members, substantially as described.

4. A ball-bearing comprising two relatively-movable members, a plurality of balls on which the members have a rolling bearing, means by which the members when moved laterally take a curvilinear movement with respect to each other, a retaining device on one member provided with a guiding-surface having a similar curve, and a retaining device on the other member provided with a guiding-surface also similarly curved and disposed at right angles to the guiding-surface of the first retaining device which it embraces, substantially as described.

5. A ball-bearing comprising two relatively-movable members one disposed above the other, oppositely-disposed concave ball-seats secured respectively to the under side of the upper member and the upper side of the lower member, the concave surfaces of the seats facing each other, a ball disposed one between each set of ball-seats providing a rolling bearing for the upper member, a retaining device secured to the upper member, and a retaining device secured to the under member and embracing the retaining device on the upper member, the two retaining devices being normally out of contact with each other and provided with guiding-surfaces so curved as to permit the lateral movement in any direction of the two members but preventing their separation, substantially as described.

In testimony whereof I have signed my name to this specification in the presence of two subscribing witnesses.

HENRY P. SCOTT.

Witnesses:
DENTON DUNN,
WARREN D. HOUSE.